(12) United States Patent
Hong et al.

(10) Patent No.: US 7,042,625 B2
(45) Date of Patent: May 9, 2006

(54) LIGHT MODULATOR HAVING DIGITAL MICRO BLAZE DIFFRACTION GRATING

(75) Inventors: Yoon Shik Hong, Gyeonggi-do (KR); Dong Ho Shin, Seoul (KR); Seung Heon Han, Seoul (KR); Yoon Joon Choi, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/171,635

(22) Filed: Jun. 29, 2005

(65) Prior Publication Data

US 2006/0077532 A1     Apr. 13, 2006

(30) Foreign Application Priority Data

Oct. 8, 2004     (KR) .................. 10-2004-0080491

(51) Int. Cl.
*B02B 26/00*     (2006.01)

(52) U.S. Cl. .............. 359/292; 359/224; 359/291; 359/295; 359/298; 359/318; 359/566; 359/569; 359/571; 359/573

(58) Field of Classification Search .............. 359/223, 359/224, 290–292, 295, 298, 303, 318, 566, 359/569, 571, 573
See application file for complete search history.

(56) References Cited

U.S. PATENT DOCUMENTS

| | | | | |
|---|---|---|---|---|
| 5,311,360 A | * | 5/1994 | Bloom et al. | 359/224 |
| 6,031,652 A | * | 2/2000 | Furlani et al. | 359/224 |
| 6,038,057 A | * | 3/2000 | Brazas et al. | 359/291 |
| 6,108,117 A | * | 8/2000 | Furlani et al. | 359/224 |
| 6,407,851 B1 | * | 6/2002 | Islam et al. | 359/291 |
| 6,813,059 B1 | * | 11/2004 | Hunter et al. | 359/290 |
| 6,822,797 B1 | * | 11/2004 | Carlisle et al. | 359/572 |
| 6,829,092 B1 | * | 12/2004 | Amm et al. | 359/573 |
| 6,829,258 B1 | * | 12/2004 | Carlisle et al. | 359/298 |
| 6,922,273 B1 | * | 7/2005 | Maheshwari et al. | 359/291 |
| 2004/0246559 A1 | * | 12/2004 | Tamada et al. | 359/291 |

* cited by examiner

*Primary Examiner*—Evelyn A. Lester
(74) *Attorney, Agent, or Firm*—Christensen O'Connor; Johnson Kindness PLLC

(57) ABSTRACT

Disclosed is a light modulator having a digital micro blaze diffraction grating. In the light modulator, a fine protrusion is formed on an edge of a lower surface of a diffraction member so that a reflective surface inclines due to the fine protrusion when the diffraction member is drawn downward.

5 Claims, 9 Drawing Sheets

LIGHT MODULATOR HAVING DIGITAL MICRO BLAZE DIFFRACTION GRATING

BACKGROUND OF THE INVENTION

1. Field of the Invention

The present invention relates, in general, to a light modulator having a digital micro blaze diffraction grating and, more particularly, to a light modulator having a digital micro blaze diffraction grating, in which a protrusion is formed on an edge of a diffraction member so that a reflective surface inclines when the diffraction member is drawn downward.

2. Description of the Prior Art

Generally, optical signal processing technology has advantages in that a great amount of data is quickly processed in a parallel manner unlike a conventional digital information processing technology in which it is impossible to process a large amount of data in real-time, and studies have been conducted on the design and production of a binary phase only filter, an optical logic gate, a light amplifier, an image processing technique, an optical device, and a light modulator using a spatial light modulation theory.

Of them, the spatial light modulator is applied to optical memory, optical display, printer, optical interconnection, and hologram fields, and studies have been conducted to develop displays employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a substrate 16, and are spaced apart from each other at regular intervals. An insulating layer 11 is deposited on the silicon substrate 16. Subsequently, a sacrificial silicon dioxide film 12 and a silicon nitride film 14 are deposited.

The nitride film 14 is patterned by the ribbons 18, and a portion of the silicon dioxide film 12 is etched, thereby maintaining the ribbons 18 on an oxide spacer layer 12 using a nitride frame 20.

In order to modulate light having a single wavelength of $\lambda_o$, the modulator is designed so that thicknesses of the ribbon 18 and oxide spacer 12 are each $\lambda_o/4$.

Limited by the vertical distance (d) between the reflective surface 22 of each ribbon 18 and the reflective surface of the substrate 16, the grating amplitude of the modulator 10 is controlled by applying a voltage between the ribbon 18 (the reflective surface 22 of the ribbon 18 acting as a first electrode) and the substrate 16 (a conductive layer 24 of a lower side of the substrate 16 acting as a second electrode). In its undeformed state, with no voltage applied, the grating amplitude is $\lambda_o/2$, and the total round-trip path difference between light beams reflected from the ribbon and substrate is one wavelength $\lambda_o$, and thus, the phase of the reflected light is reinforced.

Accordingly, in its undeformed state, the modulator 10 acts as a plane mirror when it reflects light. In FIG. 2, reference numeral 20 denotes incident light and reflected light in its undeformed state.

When a proper voltage is applied between the ribbon 18 and substrate 16, the electrostatic force enables the ribbon 18 to be moved downward toward a surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 resulting from the interference. In FIG. 3, reference numerals 28 and 30 denote light beams diffracted in a +/− diffractive mode (D+1, D−1) in a deformed state.

However, the Bloom's light modulator adopts an electrostatic method to control the position of the micromirror, which has disadvantages in that the operating voltage is relatively high (usually, 20 V or so) and the correlation between the applied voltage and the displacement is not linear, resulting in unreliable light control.

Meanwhile, Silicon Light Machines Inc. has suggested a blaze light valve device, in which blaze diffraction is conducted to control the intensity of light, as disclosed in Korean Patent Laid-Open Publication No. 2004-32908.

FIG. 4 shows a perspective view of a blaze grating light valve according to conventional technology. The blaze grating light valve 120 comprises a substrate 122, elongate members 124, first posts 126 (only one post is shown), and second posts 128 (only one post is shown). The substrate 122 includes a first conductor 130. It is preferable that each of the elongate members 124 include reflective first and second surfaces 132, 134.

The first and second surfaces 132, 134 form a blaze profile 136 for the elongate member 124. One of the first posts 126 and one of the second posts 128 function to connect each elongate member 124 to the substrate 122. Furthermore, the elongate member 124 is connected to the substrate 122 at first and second ends thereof (not shown).

FIG. 5 is a perspective view of one of the elongate members 124 and a portion of the substrate 122. Each elongate member 124 includes the reflective first and second surfaces 132, 134. The first and second surfaces 132, 134 form the blaze profile 136.

The elongate member 124 is connected through the first and second posts 126, 128 to the substrate at the first and second ends thereof (not shown). Preferably, the elongate members 124, the first posts 126, and the second posts 128 are made of an elastic material.

It is preferable that the elastic material include silicon nitride. Preferably, the first and second surfaces 132, 134 each include a reflector.

It is preferable that the reflector include an aluminum layer. Alternatively, the reflector is made of another metal. Selectively, the reflector is a multilayer dielectric reflector. The substrate 122 includes the first conductor 130.

Preferably, the substrate 122 includes silicone, and a first conductive layer is doped polysilicone. If a visible spectrum is used, the portion of the elongate member 124 between the first post 126 and the second post 128 has a length of about 200 μm and a width of about 4.25 μm.

FIG. 6 illustrates a second blaze grating light valve according to conventional technology. In the second blaze grating light valve 120B, a second elongate member 124C is used instead of the elongate member 124 of the blaze grating light valve 120.

In the second elongate member 124C, a step profile 150 of the elongate member 124 is substituted by a flat surface 226 inclined at a blaze angle (γ).

Meanwhile, U.S. Pat. No. 5,311,360 discloses a conventional blaze diffraction grating, which causes diffracted light by inclining a reflective surface using an electrostatic force, as described in an example (FIG. 7) thereof.

However, the conventional blaze diffraction grating (disclosed in the patent application of Silicon Light Machines Inc. as well as U.S. Pat. No. 5,311,360) is problematic in that, since it is difficult to precisely control the rotation angle, reliability is reduced.

Furthermore, the light modulator having a blaze diffraction grating according to the conventional technology is problematic in that it is difficult to conduct rapid control because of residual oscillation.

SUMMARY OF THE INVENTION

Therefore, the present invention has been made keeping in mind the above disadvantages occurring in the prior arts, and an object of the present invention is to provide a light modulator having a blaze diffraction grating, which has high reliability and low residual oscillation.

The above object can be accomplished by providing a light modulator having a digital micro blaze diffraction grating. The light modulator comprises a substrate; a pair of supporting members displaced on the substrate, and spaced apart from each other; a plurality of diffraction members having a band shape, which are connected to the supporting members at both ends thereof so as to be suspended on the substrate, are arranged parallel to each other, and have reflective surfaces for reflecting incident light on upper sides thereof; a plurality of protrusions, each of which is provided on an edge of a lower surface of a corresponding one of the diffraction members so that the reflective surfaces of the diffraction members incline when the diffraction members are drawn downward; and a plurality of driving units, which moves the diffraction members upward or downward so that the reflective surfaces of the adjacent diffraction members are situated at a first position, in which the reflective surfaces form a flat mirror, or at a second position, in which the reflective surfaces diffract the incident light.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention, with reference to FIGS. 7A to 9H.

Figure 1:
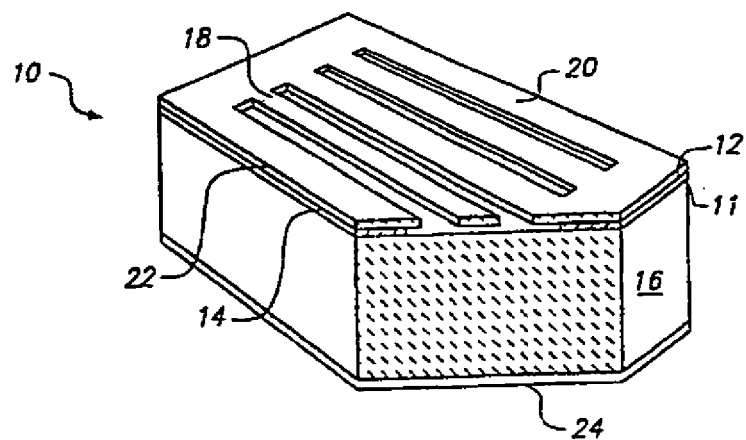
FIG. 1 illustrates an electrostatic-type grating light modulator according to conventional technology.
Figure 2:
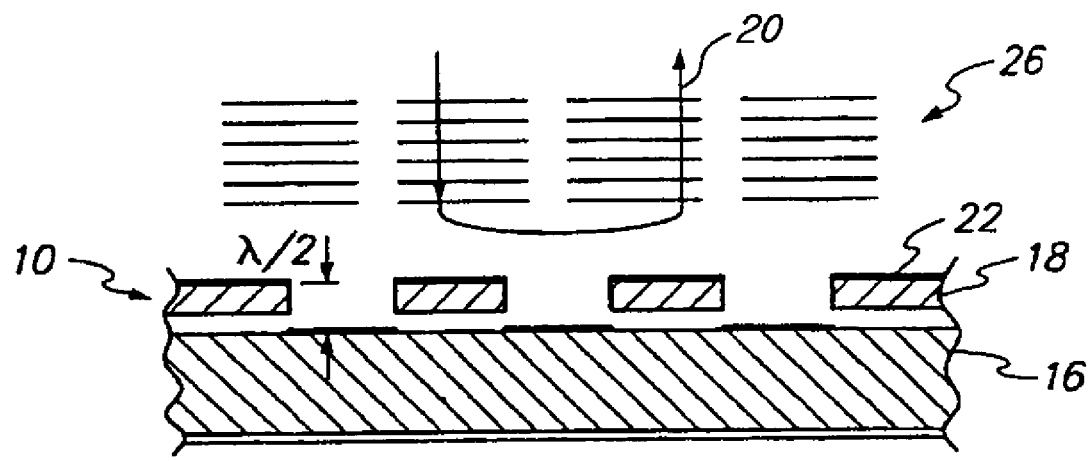
FIG. 2 illustrates reflection of incident light by the electrostatic-type grating light modulator in an undeformed state according to conventional technology.
Figure 3:
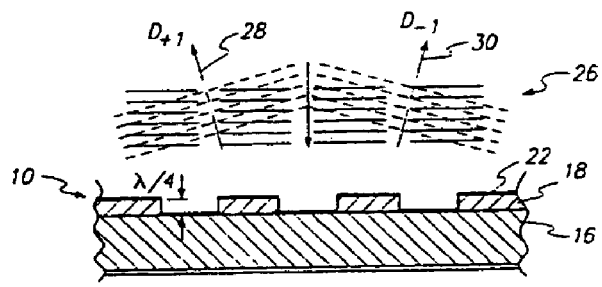
FIG. 3 illustrates diffraction of incident light by the grating light modulator in a deformed state due to electrostatic force, according to conventional technology.
Figure 4:
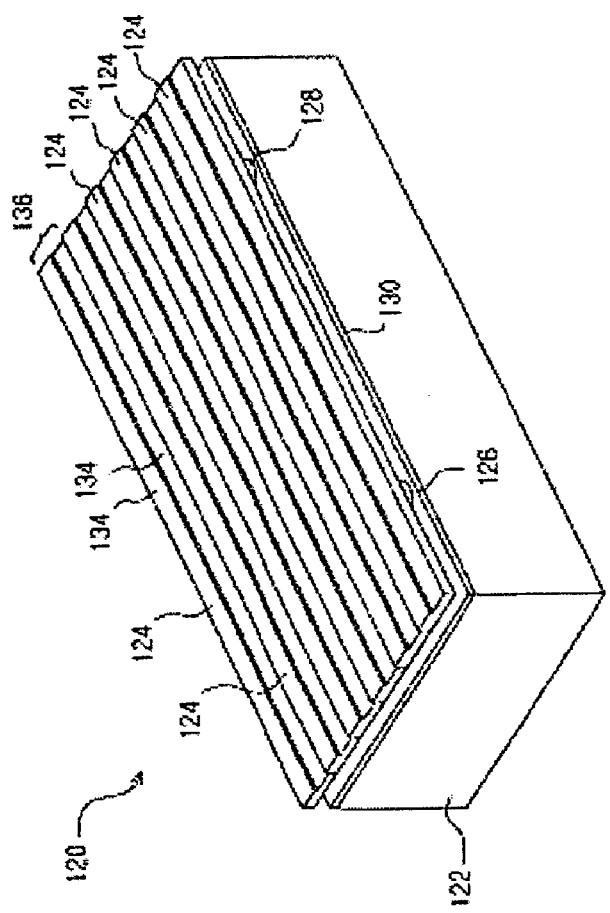
FIG. 4 is a perspective view of a blaze grating light valve (GLV) according to conventional technology.
Figure 5:
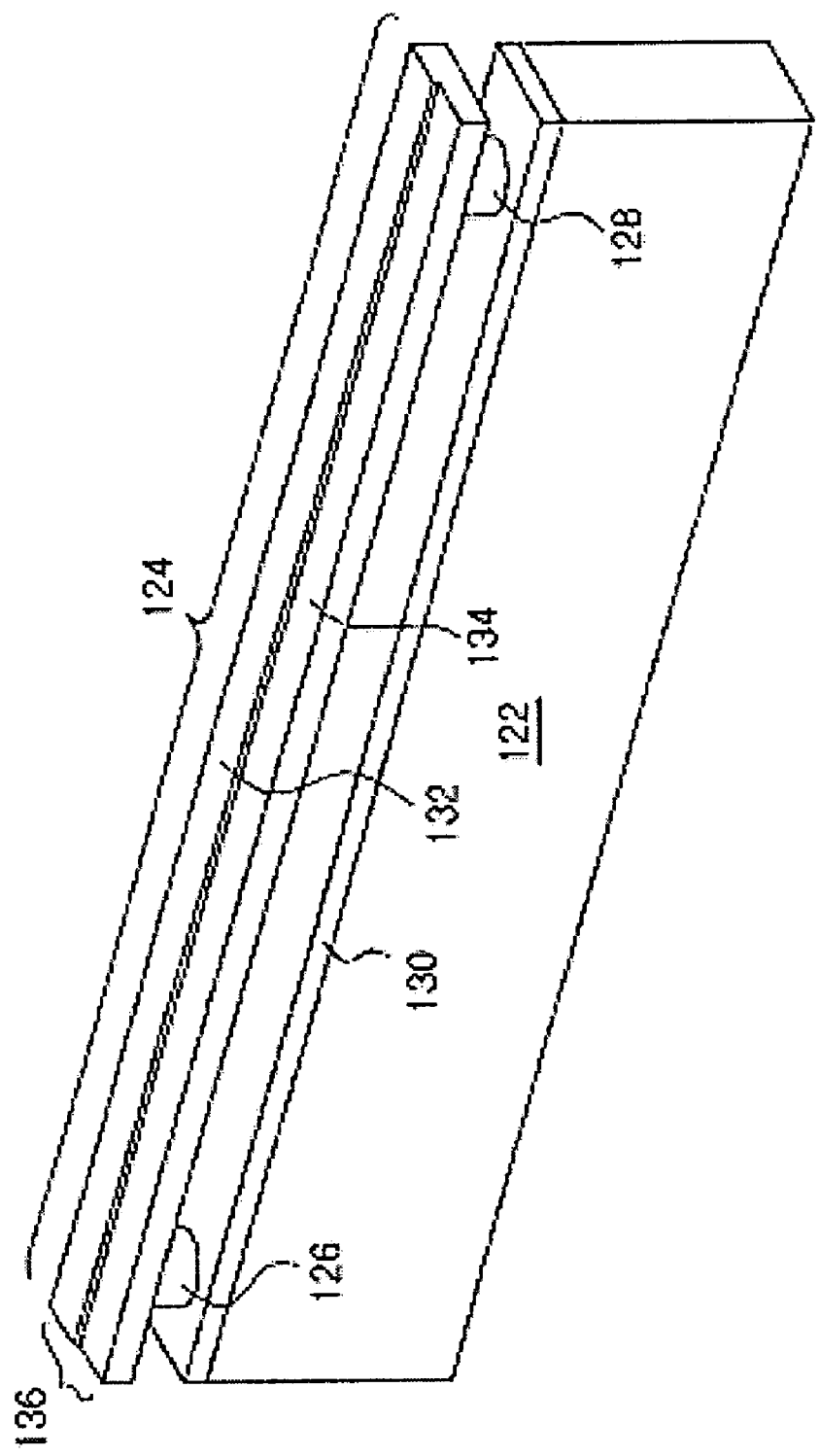
FIG. 5 is a perspective view of one elongate member and a lower substrate of the blaze grating light valve according to conventional technology.
Figure 6:
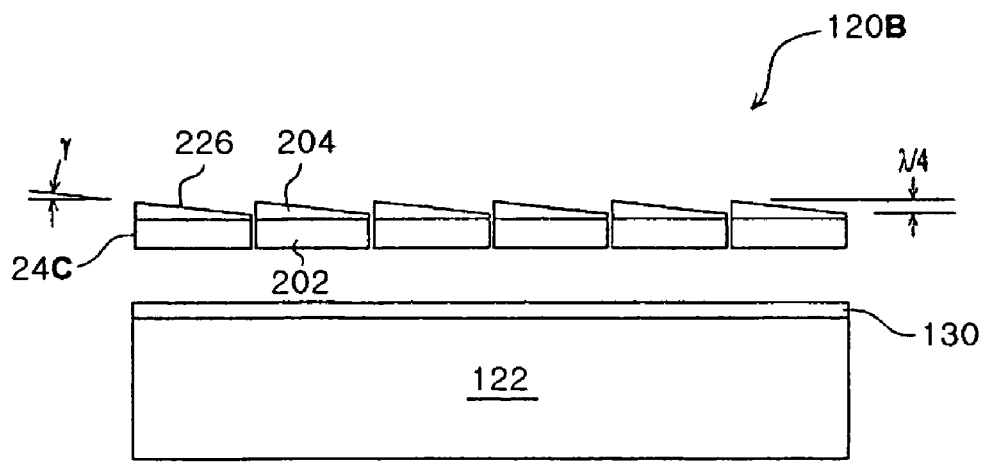
FIG. 6 illustrates a second grating light valve according to conventional technology.
Figure 7A:
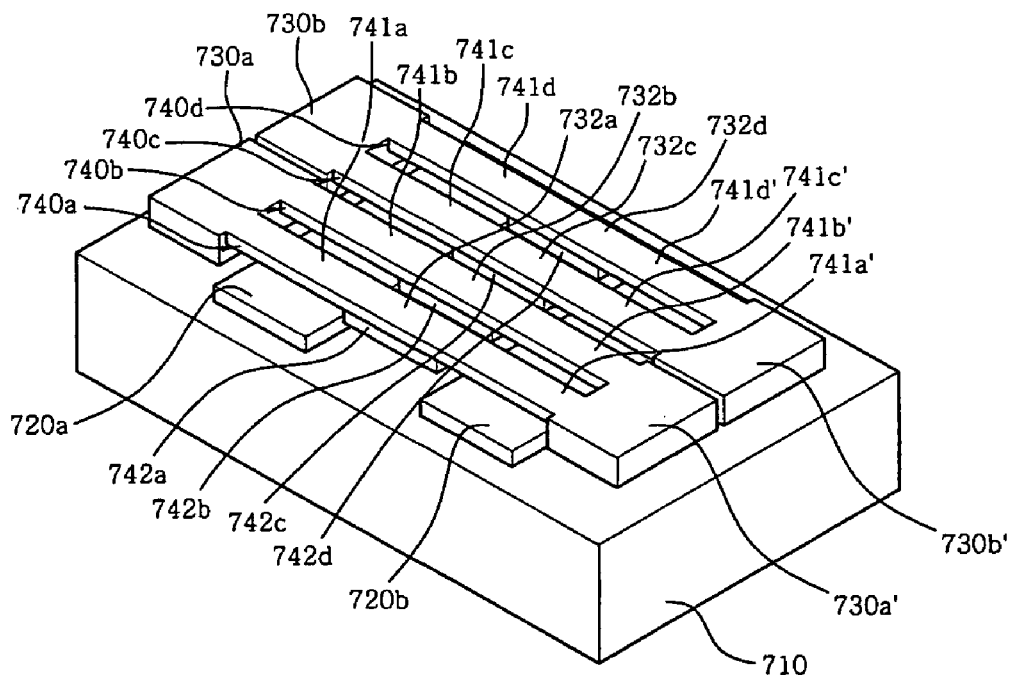
FIG. 7A is a perspective view of a light modulator having a digital micro blaze diffraction grating according to the present invention.
Figure 7B:
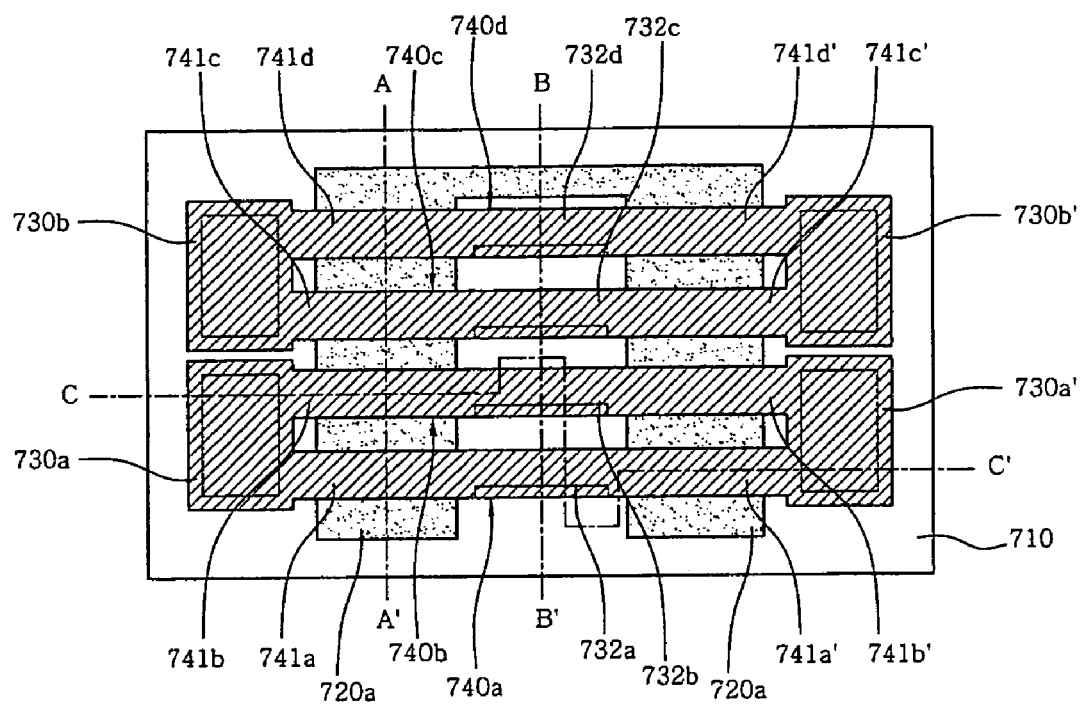
FIG. 7B is a plane view of the light modulator having a digital micro blaze diffraction grating according to the present invention.
Figure 7C:
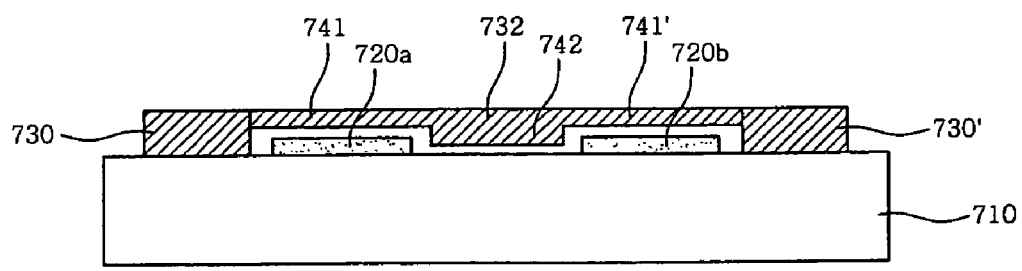
FIG. 7C is a front view of a light modulator having a variable blaze diffraction grating according to the present invention.
Figure 7D:
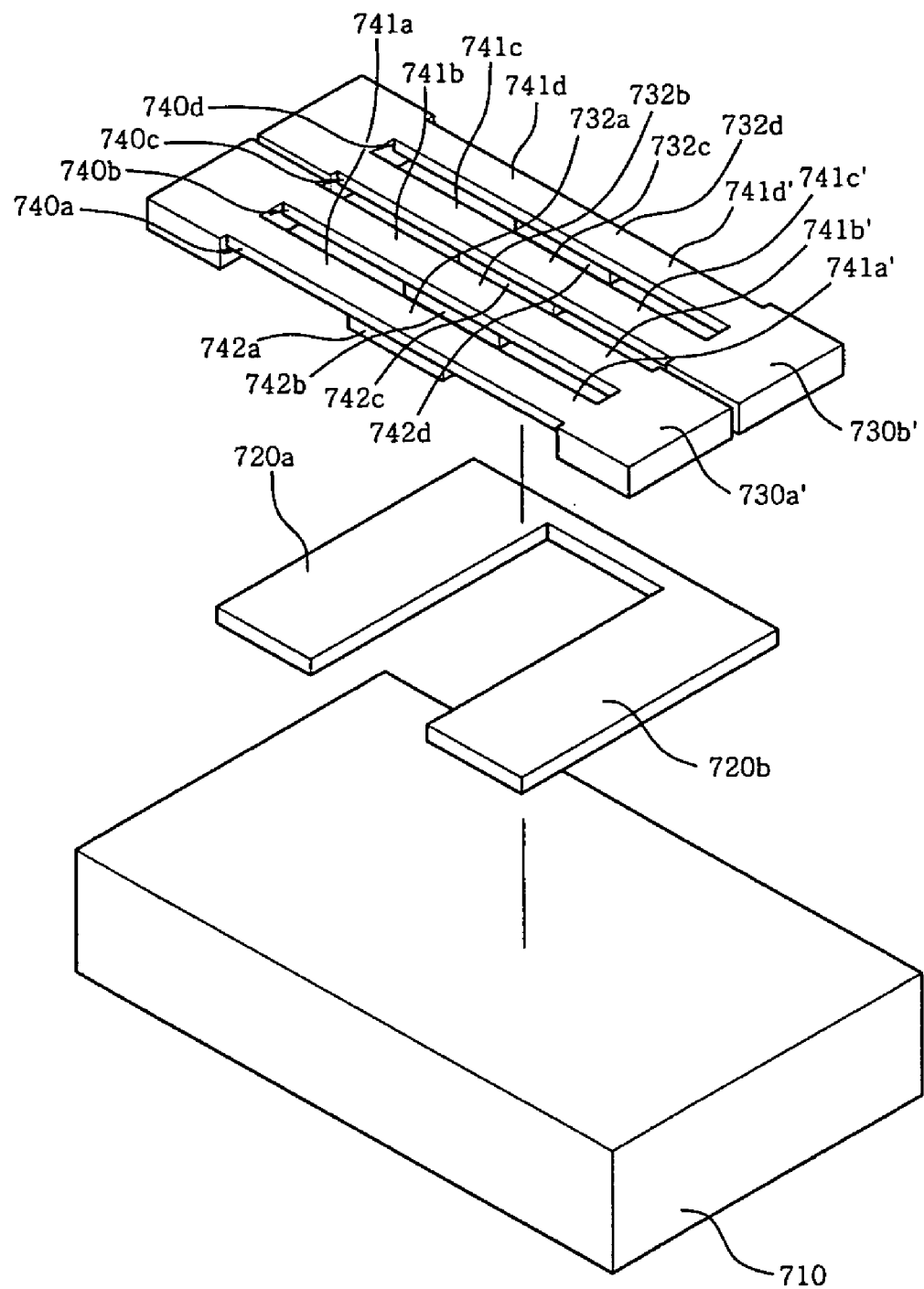
FIG. 7D is an exploded perspective view of the light modulator having the variable blaze diffraction grating according to the present invention.
Figure 7E:
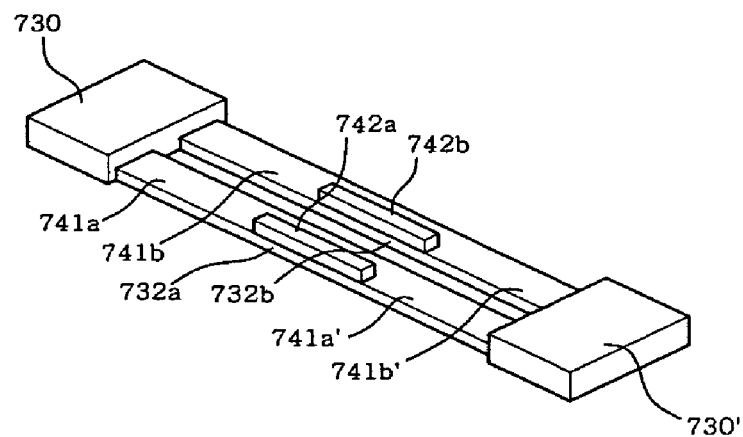
FIG. 7E is a perspective view showing a lower surface of a diffraction member.

FIG. 7a is a perspective view of a light modulator having a digital micro blaze diffraction grating according to the present invention, FIG. 7B is a plane view of the light modulator having a digital micro blaze diffraction grating according to the present invention, FIG. 7C is a front view of a light modulator having a variable blaze diffraction grating according to the present invention, FIG. 7D is an exploded perspective view of the light modulator having the variable blaze diffraction grating according to the present invention, and FIG. 7E is a perspective view showing a lower surface of a diffraction member.

Referring to FIGS. 7A to 7E, the light modulator having the digital micro blaze diffraction grating according to the present invention comprises a substrate 710, a first lower electrode 720a, a second lower electrode 720b, a lower electrode connection part 720c, supporting members 730a, 730a', 730b, 730b', and diffraction members 740a–740d.

The first lower electrode 720a is attached to an upper side of a first portion of the substrate 710, the second lower electrode 720b is attached to an upper side of a second portion of the substrate 710, and the lower electrode connection part 720c electrically connects the first lower electrode 720a to the second lower electrode 720b therethrough.

Additionally, the first supporting members 730a, 730b are positioned between the first lower electrode 720a and a first end of the substrate, and have rectangular sections. The first supporting members 730a, 730b are extended along longitudinal sides of the first lower electrode 720a. The first supporting members 730a, 730b are separated from each other by pixel units so that external power is independently supplied thereto. Thereby, they are independently operated.

Furthermore, the second supporting members 730a', 730b' are positioned between the second lower electrode 720b and a second end of the substrate, and have rectangular sections. Longitudinal sides of them are parallel to longitudinal sides of the second lower electrode 720b. The second supporting members 730a', 730b' are separated from each other in a pixel unit so that external power is independently supplied thereto. Thereby, they are independently operated.

The diffraction members 740a–740d include first external parts 741a–741d, second external parts 741a'–741d', and central parts 732a–732d.

Furthermore, first ends of the first external parts 741a–741d of the diffraction members 740a–740d are attached to the first supporting members 730a, 730b, and the second external parts 741a'–741d' are attached to the second supporting members 730a', 730b'. Accordingly, the diffraction members 740a–740d are suspended on the substrate 710.

As well, the diffraction members 740a–740d are separated from and parallel to each other as shown in FIG. 7B, which illustrates the plane view of the light modulator having the digital micro blaze diffraction grating according to the present invention. They have reflective surfaces capable of reflecting incident light on upper sides thereof.

The central parts 732a–732d of the diffraction members 740a–740d have protrusions 742a–742d formed on lower surfaces thereof so that each protrusion is longitudinally provided on an edge of the lower surface of each central part.

Each of the protrusions 742a–742d, which is comprised of an extended hexahedral piece, is attached to a side edge of the lower surface of the central part 732a –732d of the diffraction member 740a–740d.

In this regard, the protrusions 742a–742d are not in contact with the substrate 710, but suspended on the substrate. This is apparent in FIG. 7C which illustrates a front view of the light modulator having the digital micro blaze diffraction grating according to the present invention.

From FIG. 7D, which illustrates an exploded perspective view of the light modulator having the digital micro blaze diffraction grating according to the present invention, and FIG. 7E, it can be seen that the protrusions 742a–742d are attached to the central parts 732a–732d so that each protrusion is longitudinally provided on the edge of each central part.

Figure 8A:
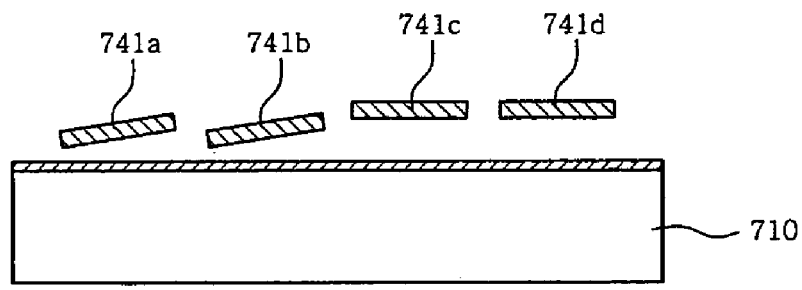
FIGS. 8A and 8b illustrate diffraction.
Figure 8B:
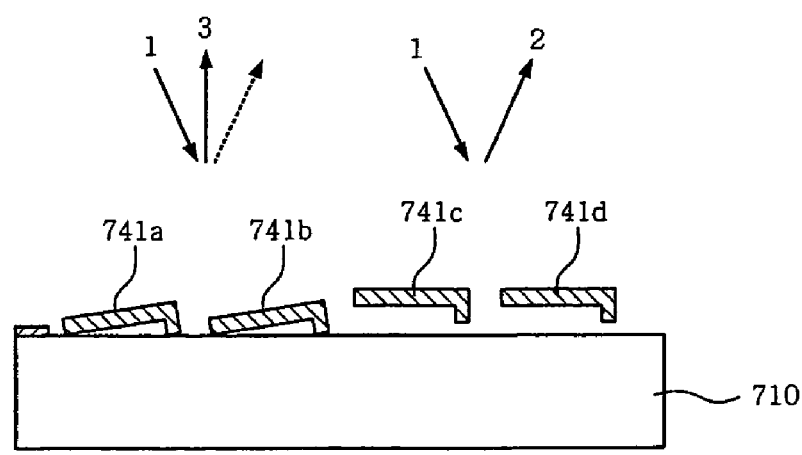

FIGS. 8A and 8B illustrate diffraction. In FIGS. 8A and 8B, a voltage ($V_o$) is applied to the diffraction members 740a, 740b, but an electric potential is not applied to the diffraction members 740c, 740d (V=0 V). FIG. 8A is a sectional view taken along the line A–A' of FIG. 7B, which shows the movement of the first external parts 741a–741d. Referring to FIG. 8A, if the voltage is applied to the lower electrodes 720a, 720b and the diffraction members 740a, 740b, the diffraction members 740a, 740b are drawn downward by an electrostatic force. At this time, the diffraction members 740a, 740b incline because of the protrusions 742a, 742b. This can be seen from FIG. 8B. In FIG. 8B, when the central parts 732a, 732b are drawn downward, the protrusions 742a, 742b come into contact with the substrate 710, thus edges of the central parts 732a, 732b, on which the protrusions 742a, 742b are not formed, come into contact with the substrate 710, thereby inclining the diffraction members 740a, 740b. With respect to this, if reflective surfaces of the central parts 732a, 732b of the diffraction members 740a, 740b incline at an angle of multiples of λ/4 when a wavelength of incident light is λ, diffraction occurs. In FIG. 8B, reference numeral 1 denotes incident light, and reference numeral 3 denotes diffracted light.

Supposing that a potential difference ($V_o$) is applied between the diffraction members 740a, 740b and the lower electrode 720, the electrostatic force is expressed by the following Equation 1.

$$F = \frac{\varepsilon A V_o^2}{2d^2} \qquad \text{Equation 1}$$

wherein, $\varepsilon$ is a dielectric constant of air between the lower electrode 720 and the diffraction members 740a–740d, A is an area to which the electrostatic force is applied, and d is a distance between the diffraction members 740a –740d and the lower electrode 720.

From Equation 1, it can be seen that when the diffraction members 740a, 740b are moved toward the substrate 710, acting as an insulator, by the electrostatic force, the electrostatic force (F) is increased. If the diffraction members 740a, 740b have an equivalent spring constant (k), the force is expressed by the following Equation 2. From Equation 2, it can be seen that the voltage ($V_o$) is not linear to a displacement (d).

$$F = \frac{\varepsilon A V_o^2}{2d^2} = k(d_o - d) \qquad \text{Equation 2}$$

wherein, $d_o$ is an initial value of d, that is, the distance when the voltage is not applied. From the above Equation, it can be seen that, when the voltage ($V_o$) is higher than a value calculated by the following Equation 3, in Equation 2, d is a negative number, which is impossible in practice. Therefore, when the voltage is applied at a level higher than the value calculated by Equation 3, instability occurs between the electrostatic electrodes, thus the diffraction members 740a, 740b come into contact with the insulating substrate 710 as shown in FIGS. 8A and 8B. With respect to this, as shown in FIG. 8A, the diffraction members 740a, 740b may be designed so as not to come into contact with the lower electrode 720 by appropriately controlling the rigidity thereof.

In FIG. 8B, the diffraction members 740a, 740b come into contact with the substrate 710 so that the diffraction members meet the substrate at a predetermined angle using the protrusion 742a, 742b on the edges of the diffraction members. In this regard, it is possible to precisely control the heights of the protrusions 742a, 742b so as to increase a path difference between light beams reflecting from inclined surfaces and to cause destructive interference between light beams reflected from the inclined surfaces. In FIG. 8B, incident light 1 radiated on the diffraction members 740a, 740b is compared to incident light radiated on the diffraction members 740c, 740d in an undeformed state.

When light is radiated on the diffraction members 740a, 740b, the path difference between light beams reflected from the diffraction members 740a and 740b is ½, thus diffracted light 3 is formed. On the other hand, when light is radiated on the diffraction members 740c, 740d, only reflected light 2 is formed, without diffraction. As described above, in the light modulator having the micro blaze diffraction grating according to the present invention, the two or more diffraction members, to which the same electric potential is applied, are integrated into one diffraction unit (i.e. a pixel), and a plurality of diffraction units are further integrated, thus it is possible to produce a multichannel light modulator which is capable of generating digital optical signals of diffraction or reflection according to a driving signal.

$$V_o = \sqrt{\frac{4kd_o^3}{27\varepsilon A}} \qquad \text{Equation 3}$$

FIGS. 9A to 9H are sectional views, which are taken along the line C–C' of FIG. 7B and show the fabrication of the digital micro blaze diffraction grating according to the present invention.

Figure 9A:
FIGS. 9A to 9H are sectional views, which are taken along the line C–C' of FIG. 7B and show the fabrication of the digital micro blaze diffraction grating according to the present invention.
Figure 9B:
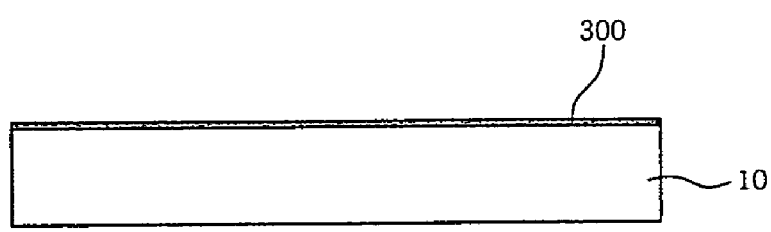
Figure 9C:
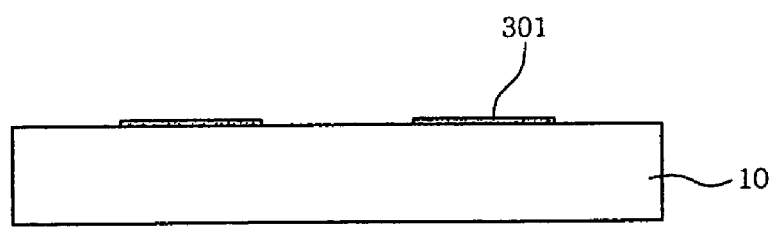

Referring to FIG. 9A, an insulating substrate 10 is prepared. In FIG. 9B, a metal layer 300, which is to be used as a lower electrode, is deposited, and in FIG. 9c, the metal layer 300 is patterned to form the lower electrode 301.

Figure 9D:
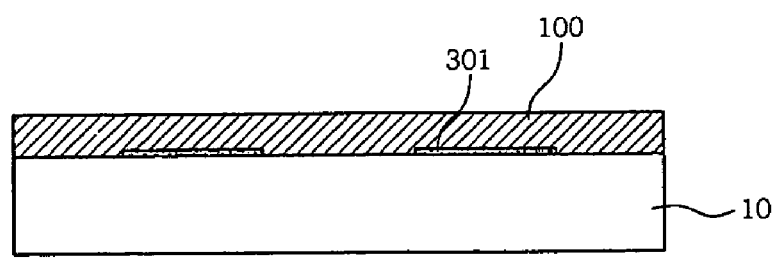
Figure 9E:
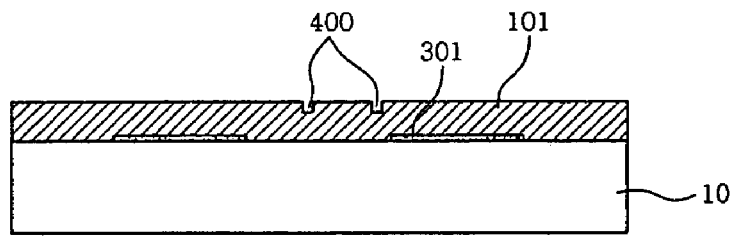

As shown in FIG. 9D, a thin film 100 (poly-Si, polymer, or the like), which is to be used as a sacrificial layer and a supporting part, is deposited. As shown in FIG. 9E, small holes 400 are formed by etching so as to form protrusions, thereby providing a thin layer 101 to be used as a supporting member.

Figure 9F:
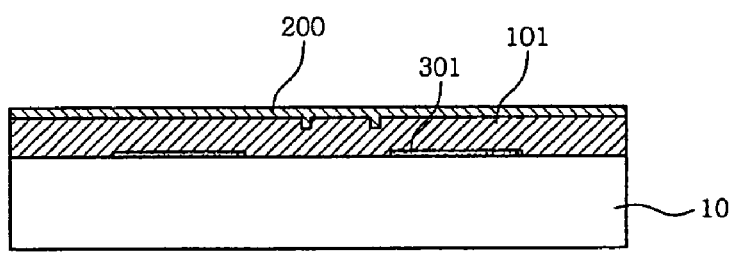
Figure 9G:
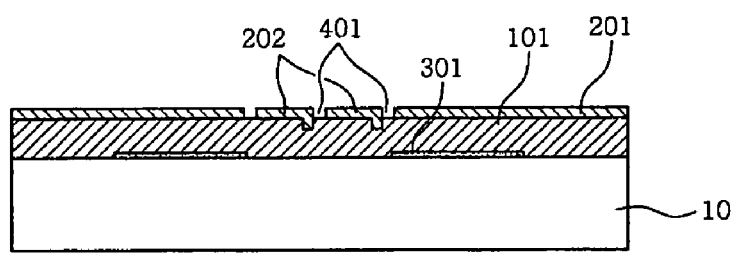
Figure 9H:
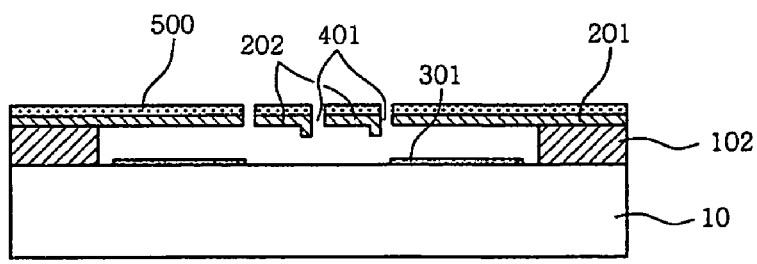

As shown in FIG. 9F, a structural thin layer 200 made of rigid metal, such as Pt, Mo, or W, is layered, and as shown in FIG. 9G, patterning is conducted to create diffraction members 201, 202. Finally, as shown in FIG. 9H, the sacrificial layer is etched while the supporting member 102 remains, thereby suspending the diffraction members 201, 202 on the substrate.

Since the diffraction members function to reflect light, a metal layer 500 having high reflectivity is further deposited, thereby completing a device.

Meanwhile, in the above description, the lower electrode is separately used. However, the substrate may be used as the lower electrode.

As described above, a digital micro blaze diffraction grating according to the present invention causes a pull-in phenomenon in a diffraction member and an insulating substrate due to unstable electrostatic driving between the diffraction member and a lower electrode. Accordingly, it is possible to form a very uniform diffraction pattern that has a level of uniformity of the substrate.

Furthermore, in the digital micro blaze diffraction grating according to the present invention, residual oscillation of a structure does not occur after it is operated, thus it is possible to rapidly produce a digital diffraction device.

Additionally, the digital micro blaze diffraction grating according to the present invention is characterized in that it can simultaneously modulate many light beams having different wavelengths by controlling an incident angle of light when it constructs a module in conjunction with an optical system.

Although a light modulator having a digital micro blaze diffraction grating according to the present invention has been disclosed for illustrative purposes, those skilled in the art will appreciate that various modifications, additions and substitutions are possible, without departing from the scope and spirit of the invention as disclosed in the accompanying claims.

What is claimed is:

1. A light modulator having a digital micro blaze diffraction grating, comprising:
   a substrate;
   a pair of supporting members displaced on the substrate, and spaced apart from each other;
   a plurality of diffraction members having a band shape, which are connected to the supporting members at both ends thereof so as to be suspended on the substrate, are arranged parallel to each other, and have reflective surfaces for reflecting incident light on upper sides thereof;
   a plurality of protrusions, each of which is provided on an edge of a lower surface of a corresponding one of the diffraction members so that the reflective surfaces of the diffraction members incline when the diffraction members are drawn downward; and
   a plurality of driving units, which moves the diffraction members upward or downward so that the reflective surfaces of the adjacent diffraction members are situated at a first position, in which the reflective surfaces form a flat mirror, or at a second position, in which the reflective surfaces diffract the incident light.

2. The light modulator as set forth in claim 1, wherein each of the protrusions is provided on an edge of a central part of the corresponding diffraction member.

3. The light modulator as set forth in claim 1, wherein each of the protrusions is a plate provided on the edge of the lower surface of the corresponding diffraction member.

4. The light modulator as set forth in claim 1, wherein each of the driving units comprises:
   a lower electrode provided on the substrate and under the diffraction members; and
   an upper electrode comprised of the diffraction members, and moved downward by electrostatic force when voltage is applied to the diffraction members.

5. The light modulator as set forth in claim 1, wherein each of the driving units comprises:
   a lower electrode comprised of the substrate; and
   an upper electrode comprised of the diffraction members, and moved downward by electrostatic force when voltage is applied to the diffraction members.

* * * * *